US005483709A

United States Patent [19]

Foster et al.

[11] Patent Number: 5,483,709

[45] Date of Patent: Jan. 16, 1996

[54] LOW AIR LOSS MATTRESS WITH RIGID INTERNAL BLADDER AND LOWER AIR PALLET

[75] Inventors: L. Dale Foster; Ryan A. Reeder, both of Brookville, Ind.

[73] Assignee: Hill-Rom Company, Inc., Batesville, Ind.

[21] Appl. No.: 221,633

[22] Filed: Apr. 1, 1994

[51] Int. Cl.[6] .............................. A61G 7/10; A47C 27/10; B65G 7/06

[52] U.S. Cl. ....................... 5/81.1; 5/455; 5/453; 180/125; 414/676

[58] Field of Search ................................ 5/453, 456, 455, 5/469, 81.1; 180/124, 125; 414/676

[56] References Cited

U.S. PATENT DOCUMENTS

| | | | |
|---|---|---|---|
| 3,253,667 | 5/1966 | Mackie | 180/124 |
| 3,795,284 | 3/1974 | Mracek et al. | 177/144 |
| 3,948,344 | 4/1976 | Johnson et al. | 180/124 |
| 4,155,421 | 5/1979 | Johnson et al. | 180/125 |
| 4,225,989 | 10/1980 | Corbett et al. | 5/453 |
| 4,272,856 | 6/1981 | Wegener et al. | 5/81.1 |
| 4,298,083 | 11/1981 | Johnson et al. | 180/125 |
| 4,399,885 | 8/1983 | Johnson et al. | 180/125 |
| 4,417,638 | 11/1983 | Harvey | 180/125 |
| 4,417,639 | 11/1983 | Wegener | 180/125 |
| 4,435,864 | 3/1984 | Callaway | 5/400 |
| 4,517,690 | 5/1985 | Wegener | 5/81.1 |
| 4,528,704 | 7/1985 | Wegener et al. | 5/81.1 |
| 4,567,957 | 2/1986 | Johnson | 180/124 |
| 4,627,426 | 12/1986 | Wegener et al. | 5/487 |
| 4,686,719 | 8/1987 | Johnson et al. | 5/81.1 |
| 4,896,389 | 1/1990 | Chamberland | 5/453 |
| 4,949,413 | 8/1990 | Goodwin | 5/453 |
| 4,953,247 | 9/1990 | Hasty | 5/453 |
| 4,962,552 | 10/1990 | Hasty | 5/453 |
| 5,044,029 | 9/1991 | Vrzalik | 5/453 |
| 5,065,464 | 11/1991 | Blanchard et al. | 5/81.1 |
| 5,067,189 | 11/1991 | Weedling et al. | 5/81.1 |
| 5,090,077 | 2/1992 | Caden et al. | 5/453 |
| 5,092,007 | 3/1992 | Hasty | 5/453 |
| 5,103,518 | 4/1992 | Gilroy et al. | 5/453 |
| 5,103,519 | 4/1992 | Hasty | 5/453 |
| 5,109,560 | 5/1992 | Uetake | 5/453 |
| 5,121,512 | 6/1992 | Kaufmann | 5/453 |
| 5,243,723 | 9/1993 | Cotner et al. | 5/453 |

*Primary Examiner*—Alexander Grosz
*Attorney, Agent, or Firm*—Barnes & Thornburg

[57] ABSTRACT

A mattress has an upper patient supporting low air loss bladder for ventilating and preventing skin degeneration of a patient supported thereby, an intermediate rigidly inflatable static bladder which becomes relatively rigid upon inflation to aid in transferring or weighing a patient, and a lower high air loss bladder for reducing the friction force between the mattress and the supporting surface to facilitate surface-to-surface transfers. The high air loss bladder includes a peripheral tube which seals against a supporting surface to contain the air which escapes from longitudinal sacks within the tube. The foot sections of the low air loss and static bladders are selectively deflatable.

18 Claims, 3 Drawing Sheets

LOW AIR LOSS MATTRESS WITH RIGID INTERNAL BLADDER AND LOWER AIR PALLET

FIELD OF THE INVENTION

This invention relates generally to patient care apparatus, and more particularly to a mattress for supporting a patient atop a hospital bed and which is useful for preventing the occurrence of bed sores on the patient's skin, weighing the patient with a patient weigh scale and transferring the patient from one surface to another surface.

BACKGROUND OF THE INVENTION

It is known to provide an air pallet for functioning as a patient mover and transferring a patient from one surface to another surface. Such an air pallet employs a number of air sacks which include holes in the lower surfaces for expelling pressurized air contained in the air sacks. Such an air pallet develops an air film between the pallet and an underlying pallet supporting surface. The resulting air film creates a low friction air bearing between the air pallet and supporting surface or otherwise a "lift" effect. One such air pallet is disclosed in Weedling et al. U.S. Pat. No. 5,067,189.

A criticism of current air pallets is that the air which escapes the holes in the lower surfaces of the longitudinal air sacks is not exploited in the most efficient manner. More particularly, current air pallets employ longitudinal air sacks which are arranged in side-by-side relation. The air sacks have lower surfaces which contain "high air loss" holes. When inflated, the lower surfaces of the air sacks become convex, with the air sacks being supported on the supporting surface at the apex of the curvature of the convex air sacks. Consequently, tunnels or spaces form between adjacent ones of the longitudinal air sacks, which spaces or tunnels are open to atmosphere at opposite ends of the air pallet. Thus, air which escapes from the high air loss holes in the longitudinal air sacks, and which could be utilized to generate the "lift" effect, finds its way to these air tunnels or passages and rushes towards one end or the other of the air pallet, escaping to atmosphere at the ends of the air pallet.

It has therefore been one objective of the present invention to provide an air pallet which more efficiently utilizes the air escaping from the sacks of an air pallet in creating the "lift" effect or air bearing.

It is also known to provide a so-called "low air loss" mattress for supporting a patient and ventilating the skin of a patient to prevent the formation of bed sores upon the patient's skin, or otherwise to prevent the degeneration of a patient's skin during long periods of confinement to a hospital bed. Such low air loss mattresses include a number of air sacks which include low air loss holes on their upper surfaces and which allow pressurized air from within the air sacks to escape upwardly and to ventilate a patient's skin thereby. One such low air loss mattress is disclosed in Chamberland U.S. Pat. No. 4,896,389 assigned to a related company, SSI Medical Services, Inc., of the assignee of the present invention.

It is also known to provide a patient mover which includes an upper patient supporting bladder in combination with a lower high air loss air pallet. Such is shown in Blanchard et al. U.S. Pat. No. 5,065,464, also assigned to the above related company of the assignee of the present invention.

There has therefore been a need to provide a more efficient air pallet for transferring a patient from one surface to another surface as well as to provide a patient supporting mattress which provides the attributes of a low air loss surface with the functional capabilities of an air pallet and which may be used as a relatively rigid support for, for example, suspending a patient from a patient weigh scale in order to take the patient's weight.

SUMMARY OF THE INVENTION

It has therefore been one objective of the present invention to provide a patient transporting air pallet which more efficiently utilizes the air escaping from the pallet in order to create a more efficient air bearing or lift effect.

Another objective of the present invention has been to provide a patient supporting mattress which provides the attributes of a low air loss patient support surface with the functional capabilities of an air pallet and which may be used for suspending a patient from a patient weigh scale when weighing the patient.

The present invention attains the stated objectives in part by providing an air pallet for supporting a load and for reducing the friction forces between the pallet and the supporting surface for facilitating surface-to-surface transfers of the load. The air pallet comprises a peripheral tube and a plurality of longitudinal air sacks interior of the periphery of the peripheral tube and having a plurality of high air loss bleed holes along the lower surfaces thereof. The lower surfaces of the longitudinal air sacks are disposed above the lower surface of the peripheral tube, such that the peripheral tube creates a skirt effect by sealing against the supporting surface trapping air which escapes from the longitudinal air sacks to provide a more efficient lift effect.

The peripheral tube includes holes which communicate with lateralmost ones of the longitudinal air sacks. The longitudinal air sacks include holes which communicate with adjacent ones of longitudinal air sacks. The peripheral tube includes an air inlet for supplying the peripheral tube with the pressurized air. The air pallet thus inflates from its peripheral edge inwardly to cradle the load thereby and to prevent side to side rocking motion and resulting instability of the pallet and load.

The invention attains others of the stated objectives by providing a mattress for supporting a patient comprising an upper patient supporting low air loss bladder for ventilating and preventing skin degeneration of the patient supported thereby, an intermediate rigidly inflatable static bladder which becomes relatively rigid upon inflation thereof and which is stiff enough to prevent "hammocking" of the mattress during transfer of the patient or when the patient is suspended on the mattress from, for example, a patient weigh scale, and a lower high air loss bladder for reducing the friction force between the mattress and a supporting surface to facilitate surface-to-surface transferring by a care provider of a patient supported on the mattress.

The mattress preferably includes the above mentioned high air loss bladder construction. The intermediate static bladder includes longitudinal walls forming longitudinal air sacks. The upper low air loss bladder preferably comprises a plurality of transverse air sacks having a plurality of low air loss bleed holes along upper surfaces and a longitudinal air distribution channel along each lateral side for supplying air to the air sacks.

Each of the bladders is independently inflatable and deflatable and thus may be selectively inflated or deflated depending on the desired operating mode of the mattress.

The present invention also attains other objectives by providing a mattress for supporting a patient comprising an upper patient supporting low air loss bladder, an intermediate rigidly inflatable static bladder, the upper and intermediate bladders having selectively inflatable and deflatable head and foot sections, and a selectively inflatable and deflatable lower high air loss bladder. The selectively inflatable and deflatable foot sections of this mattress are useful when the mattress is employed with a hospital bed which converts to a chair position.

The upper low air loss bladder comprises a plurality of transverse air sacks having a plurality of bleed holes along upper surfaces thereof and a longitudinal air distribution channel along each lateral side thereof for supplying air to the air sacks. Each air distribution channel is divided into head and foot end sections. A first valve is located in one of the distribution channels and bridges its head and foot sections, and a second valve is in fluid communication with the foot section of the bladder. When the first valve is open and the second valve is closed the head and foot sections of the low air loss bladder may be inflated, and when the first valve is closed and the second valve is open, the low air loss bladder foot section may be deflated while the low air loss bladder head section remains inflated.

The intermediate rigidly inflatable static bladder includes a transverse wall separating the bladder into head and foot sections, with each section having an air inlet/outlet connected to a pressurized air/vacuum source. When the source supplies the bladder head and foot sections with pressurized air, both sections are rigidly inflated, and when the source pulls a vacuum on the bladder foot section or is otherwise disconnected therefrom the bladder foot section may be deflated while the bladder head section remains inflated. Thus, when moving the patient bed from the bed position to the chair position, and with the lower high air loss bladder deflated, the foot sections of the upper low air loss bladder and intermediate rigidly inflatable static bladder can be selectively deflated so that the foot end of the mattress collapses thereby vacating the space at the foot end of the bed.

One advantage of the air pallet of the present invention is that a more efficient lift effect is achieved by entrapping the air which escapes from the longitudinal air sacks below the pallet, thus eliminating loss of that air at the ends of the air pallet.

Another advantage of the present invention is that a patient supporting mattress is provided which includes an upper patient supporting low air loss bladder portion for ventilating and preventing skin degeneration of a patient, an intermediate rigidly inflatable static bladder including means on lateral edges thereof for connection to a patient weigh scale or for generally moving the mattress and patient from place-to-place, with the intermediate bladder assuming a relatively rigid state upon inflation thereof and being stiff enough to prevent hammocking, and a lower high air loss bladder for reducing the friction between the mattress and a supporting surface which facilitates surface-to-surface transfers of a patient supported by the mattress, such that individual or separate mattresses and air pallets and the like are not required. Thus the invention provides a full featured stand alone mattress which does not require additional underlying or overlying mattresses.

Yet another advantage of the present invention is that a combination low air loss, static and high air loss bladder mattress is provided which includes selectively deflatable foot portions of the low air loss and static bladders and which is particularly suitable for use with a hospital bed which can assume the chair position, for vacating the foot section of the bed or otherwise creating available space thereat to better enable a patient to, for example, stand and exit the bed.

These and other objects and advantages of the present invention will become more readily apparent during the following detailed description taken in conjunction with the drawings herein, in which:

DETAILED DESCRIPTION OF THE INVENTION

Figures 1, 5:
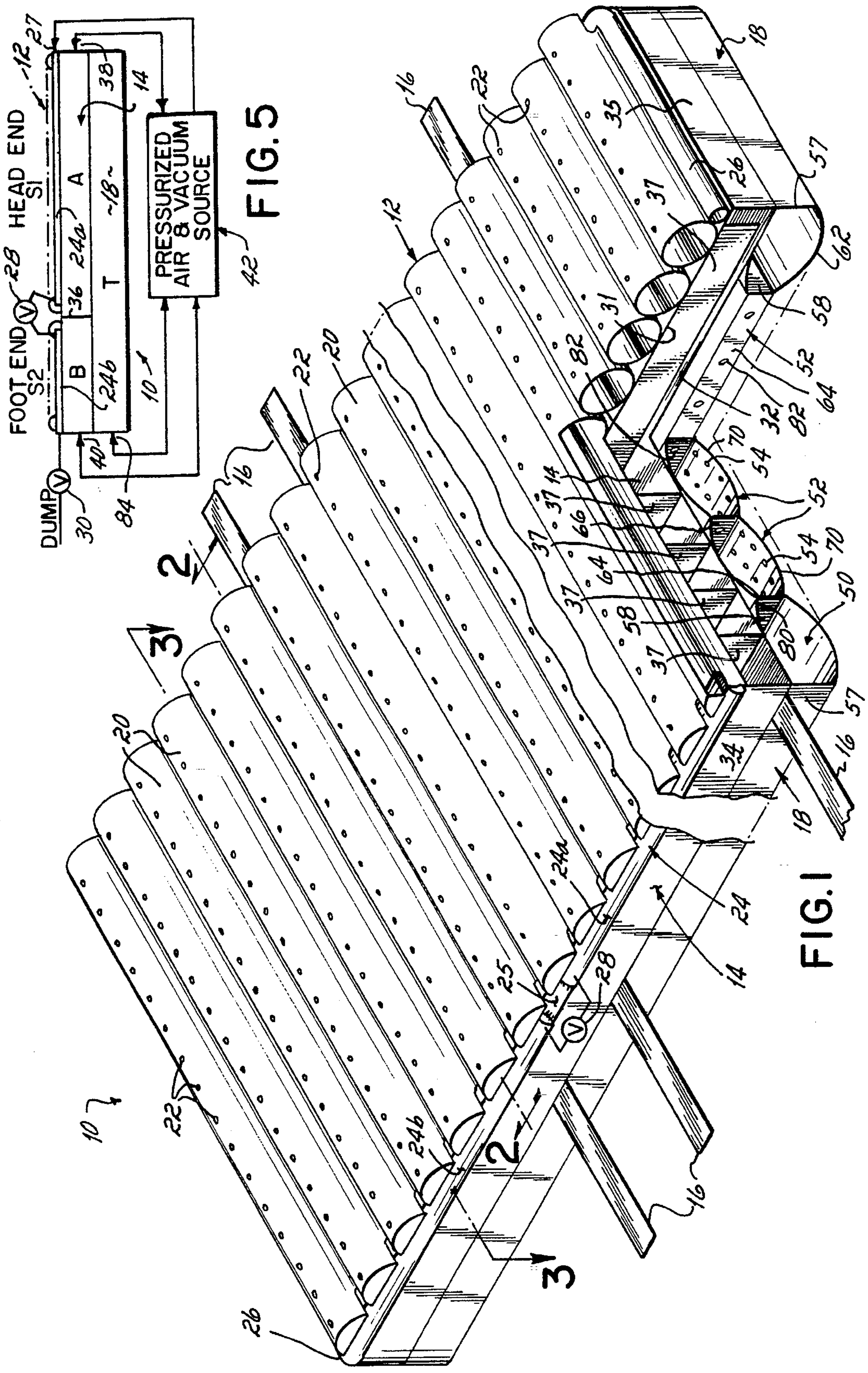
FIG. 1 is a diagrammatic perspective view of the low air loss mattress with rigid internal bladder and lower air pallet of the present invention.
FIG. 5 is a schematic diagram of the mattress and pneumatic circuitry for inflating and deflating the mattress.
Figure 2:
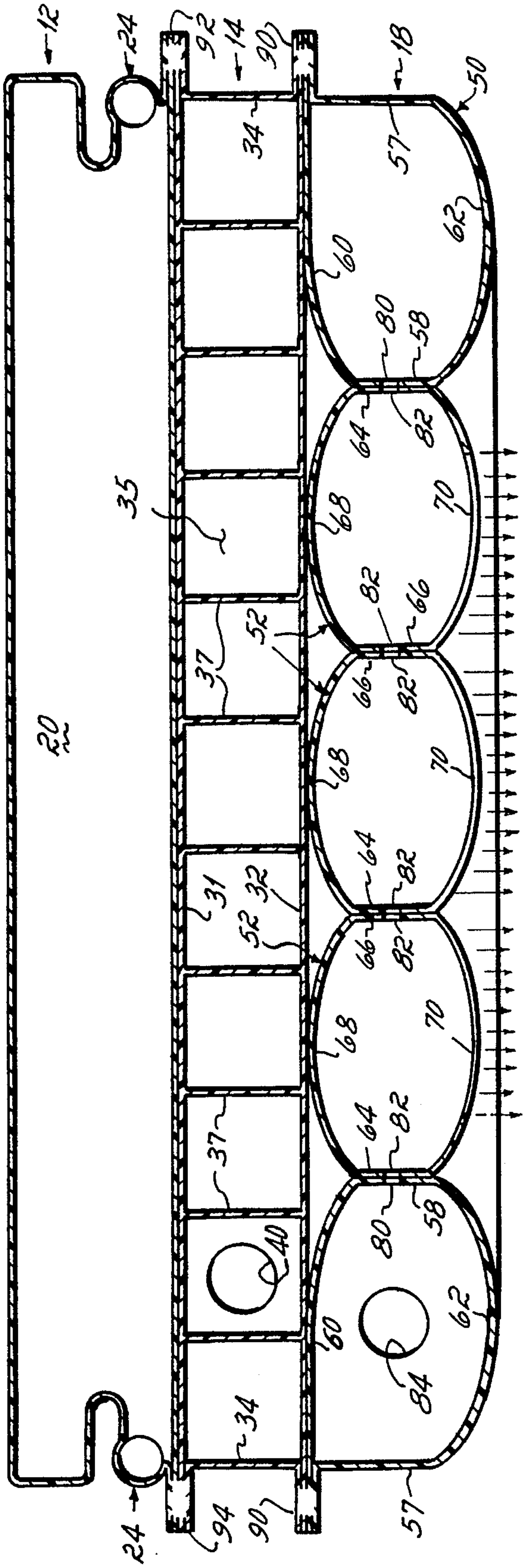
FIG. 2 is a view taking along line 2—2 of FIG. 1.
Figure 4:
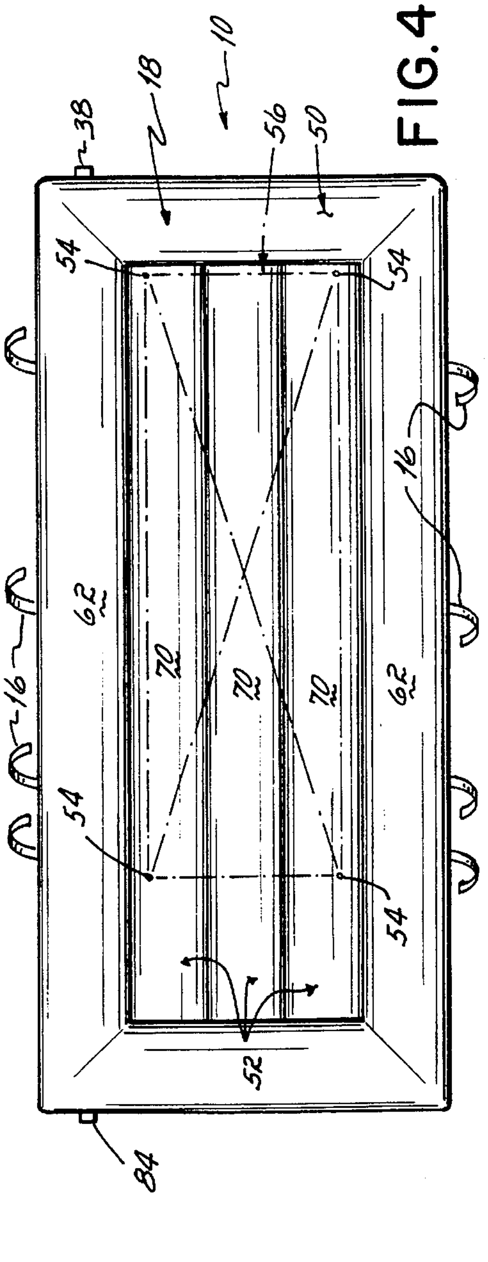
FIG. 4 is a bottom plan view of the mattress of FIGS. 1–3.

With reference to FIG. 1, there is illustrated a mattress 10 according to the present invention. The mattress 10 comprises, generally, a patient supporting low air loss bladder 12, an intermediate rigidly inflatable static bladder 14 and a lower high air loss bladder 18.

The upper patient supporting low air loss bladder 12 is for ventilating and preventing skin degeneration of a patient supported thereon. The intermediate rigidly inflatable static bladder 14 includes straps or other means 16 on lateral edges thereof for connection to a patient weigh scale, for example, of the type disclosed in application Ser. No. 08/221,748, filed Mar. 31, 1994, entitled PATIENT WEIGH SCALE, assigned to the assignee of the present invention and incorporated by reference herein as if fully set forth in its entirety, and becomes relatively rigid upon inflation thereof and stiff enough to prevent so-called "hammocking" of the mattress 10 upon being suspended by the strap means 16 when supporting a patient from a patient weigh scale. Strap means 16 may also be employed to secure mattress 10 to the deck of a hospital bed (not shown). The lower high air loss bladder 18 is for reducing the friction force between the mattress and a supporting surface to facilitate surface-to-surface transfers of a patient supported on the mattress by a care provider.

Referring now to FIGS. 1–4, the upper patient supporting low air loss bladder 12 is constructed generally in accordance with Chamberland U.S. Pat. No. 4,896,389, which is incorporated by reference herein as if fully set forth in its entirety. The low air loss bladder 12 includes a number of transversely oriented air sacks 20, each of which includes a plurality of bleed holes 22 along upper surfaces thereof. A longitudinal air distribution channel 24 runs the length of the low air loss bladder 12 on either lateral side thereof and is in fluid communication with each of the transverse air sacks 20. Each channel 24 is divided into a head section **24*a* and a foot section 24*b* by virtue of a wall 25 therebetween. The head ends 24*a* of the air distribution channels 24 are connected via a transverse plenum conduit 26. Likewise, the foot ends 24*b* of the air distribution channels 24 are connected with a similar transverse plenum conduit 26. The transverse plenum conduit 26 located at the head end of the mattress 10 includes an air inlet 27 (shown diagrammatically in FIGS. 3 and 5**).

A valve 28 located in one of the longitudinal air distribution channels 24 bridges the wall 25 thus dividing the low air loss bladder into a head end section S1 and a foot end section S2 (FIG. 5). Opening valve 28 allows the foot section S2 to be inflated upon air entering inlet 27. Closing valve 28 separates the foot section S2 from the head section S1. Another valve 30 located in the foot end of the same air distribution channel 24 allows the foot end S2 of the low air loss bladder to be evacuated independently of the head end S1 upon closing the valve 28 and opening the valve 30.

Figure 3:
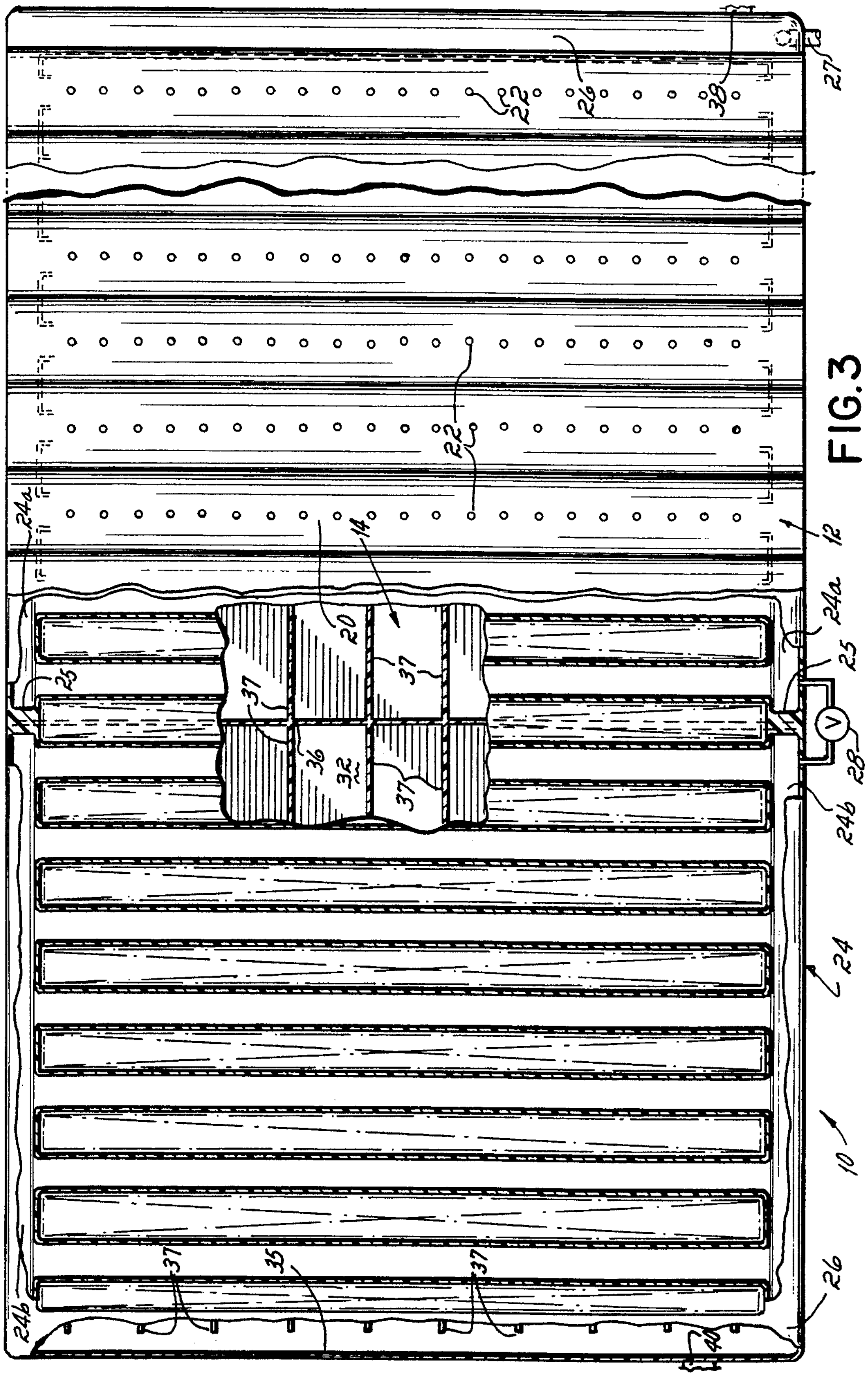
FIG. 3 is a view taken generally along line 3—3 of FIG. 1.

The intermediate rigidly inflatable static bladder 14 includes a top wall 31, a bottom wall 32, and side walls 34, 34 and end walls 35, 35 connecting the top and bottom walls 31 and 32. A transverse wall 36 (FIGS. 3 and 5) separates the rigidly inflatable static bladder 14 into head and foot end sections A and B, respectively. A plurality of longitudinal intermediate walls 37 connect the top and bottom walls 31 and 32 together over substantially the entire length of the bladder 14, but are not connected to end walls 35, 35 (FIGS. 1 and 3). An air inlet/outlet 38 serves the head end section A of the bladder 14, and a similar inlet/outlet 40 serves the foot end section B of the bladder 14. The head and foot ends A and B, respectively, of bladder 14 are selectively inflatable and deflatable via pressurized air entering ends A and B via inlets/outlets 38 and 40, respectively. When bladder 14 head and foot end sections A and B are supplied with pressurized air, both of the sections become rigidly inflated. When a vacuum on inlet/outlet 40 is pulled or when 40 is opened to atmosphere, the foot end section B of bladder 14 deflates while the head end section A of the bladder 14 remains inflated. Thus both the foot end portions S2 and B of bladders 12 and 14, respectively, are selectively deflatable for use with a hospital bed which can assume a chair position.

The lower high air loss bladder 18 comprises a peripheral tube 50 and a plurality of longitudinal air sacks 52 interior of the periphery of the peripheral tube 50. The longitudinal air sacks 52 include a plurality of bleed holes 54 forming an approximate 16.5 inch wide by 52.5 inch long pattern 56 (FIG. 4) of 0.031 inch diameter holes spaced on 0.5 inch centers. The peripheral tube 50 includes side walls 57, 58, a top wall 60 and a bottom wall 62. Top and bottom walls 60 and 62 are generally convex when inflated. Similarly, longitudinal air sacks 52 include side walls 64, 66, a convex top wall 68 and a convex bottom wall 70. The extrememost lower surfaces of the bottom wall 70 of the air sacks 52 are located above the extreme-most lower surface of the bottom wall 50 of the tube 50. Since tube 50 completely surrounds the sacks 52, air escaping through bleed holes 54 is trapped within the peripheral tube 50 and under the high air loss bladder 18 of mattress 10, creating a skirt effect and thus a more efficient lift effect. The laterally inwardmost side wall 58 of the tube 50 includes holes 80 therein which communicate with similar holes 82 in the laterally outwardmost side wall 64 of the lateralmost ones of the sacks 52. The laterally inwardmost walls 66 of the lateralmost air sacks 52 likewise include holes 82 therein which communicate with similar holes 82 in the center sack 52. Thus, air entering inlet/outlet 84 (FIGS. 2 and 5) first inflate the peripheral tube 50. Then air passes through the holes 80 in the tube 50 and through holes 82 in the lateralmost sacks 52 to inflate the lateralmost sacks 52. Finally, air passes through holes 82 of the laterally inwardmost walls 66 of the lateralmost air sacks 52 and through similar holes 82 in the center sack 52 to inflate the center sack 52. Thus, the bladder 18 inflates progressively inwardly from the periphery thereof so as to cradle the patient situated atop the mattress 12 preventing side to side rocking motion of the mattress and patient and resulting instability of the mattress and patient.

High air loss bladder 18 and rigid static bladder 14 are joined at respective lateral edges by seams 90 which connect the side walls 34 and bottom 32 of bladder 14 with the top wall 60 and lateralmost side walls 57 of peripheral tube 50. Similarly, seams 92 join rigid static bladder 14 with low air loss bladder 12 at their respective edges by joining the bottom wall of the bladder 12 with the top and side walls 31, 34, respectively, of bladder 14.

A suitable pressurized air/vacuum source 42 includes suitable connections and the like for connecting to inlet 27 of bladder 12, inlets/outlets 38, 40 of bladder 14 and inlet/outlet 84 of bladder 18.

In use, the pressures within the bladders 12, 14 and 18 of the mattress 10 are regulated via the pressurized air/vacuum source 42 (FIG. 5). When the mattress 10 is employed as a traditional sleep surface on a hospital bed, both the head and foot ends S1 and S2 of high air loss bladder 18 are inflated, as are the head and foot ends A and B of the rigid static bladder 14. The bladders 12 and 14 are preferably maintained at 0.5 psi, with the low air loss bladder 12 having a low air loss rate of about 7.8 cubic feet per minute. In this operating mode, the static bladder 14 is inflated enough to prevent a patient from bottoming out on a hard hospital bed surface below the patient, but not so much as to be uncomfortably rigid. Once inflated, supply lines from source 42 may be removed from inlets/outlets 38 and 40 of bladder 14 and those inlets/outlets simply closed off; source 42 must continually supply low air loss bladder 12 with pressurized air.

When the mattress 10 is employed to weigh a patient on a patient weigh scale via the straps 16, the head and foot ends S1 and S2 of the bladder 12 are deflated to 0 psi upon opening valve 30 and disconnecting the inlet 27 supply line from the source 42 or alternatively by leaving valve 28 closed, opening valve 30 and disconnecting source 42 from inlet 27. Likewise, the supply line connecting source 42 to the high air loss bladder 18 is disconnected from inlet 84 or inlet 84 is otherwise simply opened and it, too, deflates to 0 psi. The head and foot ends A and B of the bladder 14 are then inflated to 3 psi via the source 42, and the supply lines connecting the source 42 to the head and foot end inlets 38 and 40 are again disconnected and then inlets 38 and 40 are closed. At this point, the bladder 14 is sufficiently rigid to prevent hammocking upon suspending a patient by the straps 16 from a patient weigh scale. Further, no supply lines are connected to the mattress 10 which would create undesirable drag thus affecting accuracy of the patient's weight.

When the mattress 10 is employed on a hospital bed that can articulate to a chair position, and particularly when mattress 10 is utilized with a bed having an vacatable foot section such that is disclosed in application Ser. No. 08/186,657, filed Jan. 25, 1994, entitled FOOT EGRESS CHAIR BED, assigned to the assignee of the present invention and incorporated by reference herein as if fully set forth in its entirety, and when moving the hospital bed to that chair position, the head ends S1 and A of bladders 12 and 14, respectively are maintained at 0.5 psi by the source 42; foot ends S2 and B of the bladders 12 and 14, respectively, are deflated to 0 psi. Valve 28 of bladder 12 is closed, and valve 30 of bladder 12 is opened so as to fully deflate foot end S2 and bladder 12. Similarly, a vaccuum is pulled on inlet/outlet 40 of foot section B of bladder 14 by source 42 or 40 is simply opened to atmosphere thus allowing it to fully deflate. The bladder 18 in this mode is likewise at 0 psi with the supply line normally connecting the source 42 to the inlet 84 being disconnected. Thus, the foot end of the mattress 12 is fully collapsed thereby providing additional space at the foot end of the hospital bed for patient egress or the docking of ambulatory or rehabilitation type items to the hospital bed.

Lastly, when the mattress 10 is used to transfer a patient from one surface to another surface, the head and foot ends S1 and S2 of bladder 12 are deflated to 0 psi. Head and foot ends A and B of bladder 14 are inflated to 3 psi, and high air loss bladder 18 is likewise inflated to 3 psi, the high air loss bladder 18 having a high air loss rate of about 26.6 cubic feet per minute. In this mode, the high air loss bladder 18 generates the above described lift or air bearing effect for facilitating surface-to-surface transfers of a patient situated atop the mattress 10.

Further, should unpowered transport of a patient occur, even though bladders 12 and 18 are fully deflated (since no power is supplied to source 42) nonetheless a soft mattress surface is provided during such unpowered transport by virtue of static bladder 14.

A further feature of the invention is the launderability of mattress 10. Preferably mattress 10 is assigned to a patient upon admittance to a hospital through the ER and remains with the patient throughout his/her stay up to discharge from the hospital. After the patient is discharged the mattress 10 may be laundered and be ready to be assigned to a new patient entering the hospital.

Those skilled in the art will readily recognized numerous adaptations and modifications which can be made to the present invention which will result in an improved low air loss mattress with rigid internal bladder and lower air pallet, yet all of which will fall within the spirit and scope of the present invention as defined in the following claims. Accordingly, the invention is to be limited only by the scope of the following claim and their equivalents.

What is claimed is:

1. A mattress for supporting a patient comprising:

an upper patient supporting low air loss bladder for ventilating and preventing skin degeneration of a patient supported thereby;

an intermediate rigidly inflatable static bladder including means on lateral edges thereof for connection to a patient weigh scale, said intermediate bladder becoming relatively rigid upon inflation thereof and being stiff enough to prevent hammocking upon being suspended by said connection means from a patient weigh scale when supporting a patient; and a lower high air loss bladder for reducing the friction force between said mattress and a supporting surface to facilitate surface-to-surface transferring of a patient supported on said mattress by a care provider.

2. The mattress of claim 1 wherein said upper low air loss bladder comprises a plurality of transverse air sacks having a plurality of bleed holes along upper surfaces thereof and a longitudinal air distribution channel along each lateral side thereof for supplying air to said air sacks.

3. The mattress of claim 1 wherein said lower high air loss bladder comprises a peripheral tube and a plurality of longitudinal air sacks interior of the periphery of said peripheral tube and having a plurality of bleed holes along lower surfaces thereof, the lower surfaces of said longitudinal air sacks being disposed above the lower surface of said peripheral tube whereby said peripheral tube creates a skirt effect by sealing against the supporting surface trapping air which escapes from said longitudinal air sacks therein to provide a more efficient lift effect.

4. The mattress of claim 3 wherein said lower high air loss bladder includes holes in said peripheral tube which communicate with lateralmost ones of said longitudinal air sacks and holes in said longitudinal air sacks which communicate with adjacent ones of said longitudinal air sacks, whereby said lower high air loss bladder inflates from peripheral edges thereof inwardly to cradle a patient thereby and prevent side-to-side rocking motion and resulting instability of said mattress.

5. An air pallet for supporting a load and for reducing the friction forces between said pallet and facilitating surface-to-surface transfers of the load comprising:

a peripheral tube; and a plurality of longitudinal air sacks interior of the periphery of said peripheral tube and having a plurality of bleed holes along lower surfaces thereof;

the lower surfaces of said longitudinal air sacks being disposed above the lower surface of said peripheral tube, whereby said peripheral tube creates a skirt effect by sealing against the supporting surface trapping air which escapes from said longitudinal air sacks therein to provide a more efficient lift effect.

6. The air pallet of claim 5 wherein said peripheral tube includes holes which communicate with lateralmost ones of said longitudinal air sacks, and wherein said longitudinal air sacks include holes which communicate with adjacent ones of said longitudinal air sacks whereby said air pallet inflates from peripheral edges thereof inwardly to cradle a load thereby and prevent side-to-side rocking motion and resulting instability of said pallet.

7. A mattress for supporting a patient comprising:

a patient supporting low air loss bladder for ventilating and preventing skin degeneration of a patient supported thereby; and a high air loss bladder for reducing the friction force between said mattress and a supporting surface to facilitate surface-to-surface transferring of a patient supported on said mattress by a care provider;

wherein said high air loss bladder comprises a peripheral tube and a plurality of longitudinal air sacks interior of the periphery of said peripheral tube and having a plurality of bleed holes along lower surfaces thereof, the lower surfaces of said longitudinal air sacks being disposed above the lower surface of said peripheral tube whereby said peripheral tube creates a skirt effect by sealing against the supporting surface trapping air which escapes from said longitudinal air sacks therein to provide a more efficient lift effect.

8. The mattress of claim 7 wherein said high air loss bladder includes holes in said peripheral tube which communicate with lateralmost ones of said longitudinal air sacks and holes in said longitudinal air sacks which communicate with adjacent ones of said longitudinal air sacks, whereby said lower high air loss bladder inflates from peripheral edges thereof inwardly to cradle a patient thereby and prevent side-to-side rocking motion and resulting instability of said mattress.

9. A mattress for supporting a patient comprising:

a rigidly inflatable static bladder including means on lateral edges thereof for connection to a patient weigh scale, said bladder becoming relatively rigid upon inflation thereof and being stiff enough to prevent hammocking upon being suspended by said connection means from a patient weigh scale when supporting a patient; and a high air loss bladder for reducing the friction force between said mattress and a supporting surface to facilitate surface-to-surface transferring of a patient supported on said mattress by a care provider;

said high air loss bladder comprising a peripheral tube and a plurality of longitudinal air sacks interior of the periphery of said peripheral tube and having a plurality of bleed holes along lower surfaces thereof, the lower surfaces of said longitudinal air sacks being disposed above the lower surface of said peripheral tube whereby said peripheral tube creates a skirt effect by sealing against the supporting surface trapping air which escapes from said longitudinal air sacks therein to provide a more efficient lift effect.

10. The mattress of claim 9 wherein said high air loss bladder includes holes in said peripheral tube which communicate with lateralmost ones of said longitudinal air sacks and holes in said longitudinal air sacks which communicate with adjacent ones of said longitudinal air sacks, whereby said lower high air loss bladder inflates from peripheral edges thereof inwardly to cradle a patient thereby and prevent side-to-side rocking motion and resulting instability of said mattress.

11. A mattress for supporting a patient comprising;

an upper patient supporting low air loss bladder for ventilating and preventing skin degeneration of a patient supported thereby;

an intermediate rigidly inflatable static bladder including means on lateral edges thereof for connection to a patient weigh scale, said intermediate bladder becoming relatively rigid upon inflation thereof and being stiff enough to prevent hammocking upon being suspended by said connection means from a patient weigh scale when supporting a patient;

said upper and intermediate bladder having selectively and independently inflatable and deflatable head and foot sections; and a selectively inflatable and deflatable lower high air loss bladder having a plurality of downwardly facing bleed holes for reducing the friction force between said mattress and a supporting surface to facilitate surface-to-surface transferring of a patient supported on said mattress by a care provider.

12. The mattress of claim 11 wherein said upper low air loss bladder comprises a plurality of transverse air sacks having a plurality of bleed holes along upper surfaces thereof and a longitudinal air distribution channel along each lateral side thereof for supplying air to said air sacks, each said channel being divided into head and foot end sections, a first valve in one of said distribution channels bridging said head and foot sections of said one channel, and a second valve in fluid communication with said foot end of said upper bladder foot section, whereby when said first valve is open and said second valve is closed said head and foot sections of said low air loss bladder may be inflated, and when said first valve is closed and second valve is open said upper bladder foot section may be deflated while said upper bladder head section remains inflated.

13. The mattress of claim 11 wherein said intermediate rigidly inflatable static bladder includes a transverse wall separating said bladder into head and foot sections, with each said section having an air inlet/outlet connected to a pressurized air/vacuum source, whereby when said source supplies said bladder head and foot sections with pressurized air both said sections are rigidly inflated, and when said source pulls a vacuum on said bladder foot section, said bladder foot section is deflated while said bladder head section remains inflated.

14. The mattress of claim 13 wherein said intermediate rigidly inflatable static bladder further includes a plurality of longitudinal walls substantially the entire length of said static bladder.

15. A mattress for supporting a patient comprising:

an upper patient supporting low air loss bladder for ventilating and preventing skin degeneration of a patient supported thereby;

an intermediate rigidly inflatable static bladder adapted to become relatively rigid upon inflation and being stiff enough to prevent hammocking upon said mattress being suspended from a patient weigh scale when supporting a patient; and a lower high air loss bladder for reducing the friction force between said mattress and a supporting surface to facilitate surface-to-surface transferring of a patient supported on said mattress by a care provider.

16. The mattress of claim 15 wherein the mattress is launderable.

17. A mattress for supporting a patient comprising:

a rigidly inflatable static bladder adapted to become relatively rigid upon inflation and being stiff enough to prevent hammocking upon said mattress being suspended from a patient weigh scale when supporting a patient; and a high air loss bladder for reducing the friction force between said mattress and a supporting surface to facilitate surface-to-surface transferring of a patient supported on said mattress by a care provider;

said high air loss bladder comprising a peripheral tube and a plurality of longitudinal air sacks interior of the periphery of said peripheral tube and having a plurality of bleed holes along lower surfaces thereof, the lower surfaces of said longitudinal air sacks being disposed above the lower surface of said peripheral tube whereby said peripheral tube creates a skirt effect by sealing against the supporting surface trapping air which escapes from said longitudinal air sacks therein to provide a more efficient lift effect.

18. A mattress for supporting a patient comprising;

an upper patient supporting low air loss bladder for ventilating and preventing skin degeneration of a patient supported thereby;

an intermediate rigidly inflatable static bladder adapted to become relatively rigid upon inflation and being stiff enough to prevent hammocking upon said mattress being suspended from a patient weigh scale when supporting a patient;

said upper and intermediate bladder having selectively and independently inflatable and deflatable head and foot sections; and a selectively inflatable and deflatable lower high air loss bladder having a plurality of downwardly facing bleed holes for reducing the friction force between said mattress and a supporting surface to facilitate surface-to-surface transferring of a patient supported on said mattress by a care provider.

* * * * *